United States Patent Office 3,641,005
Patented Feb. 8, 1972

3,641,005
**PROCESS FOR THE PREPARATION OF Δ⁴-6,6-DI-
FLUORO - 3,20 - DIKETO - 17α,21-DIHYDROXY-
PREGNENES**
George Albert Boswell, Jr., and William Charles Ripka,
Wilmington, Del., assignors to E. I. du Pont de Nemours
and Company, Wilmington, Del.
No Drawing. Filed Apr. 22, 1970, Ser. No. 31,004
Int. Cl. C07c 169/32, 173/00
U.S. Cl. 260—239.55 D                          11 Claims

ABSTRACT OF THE DISCLOSURE

Title compounds are prepared from Δ⁵-3-alkanoyl-17α,20; 20,21-bismethylenedioxypregnenes by a process involving the addition of NOF; hydrolysis of the resulting 5α-fluoro-6-nitriminosteroid to the 5α-fluoro-6-ketosteroid; hydrolysis of the 3-alkanoyl and bismethylenedioxy groups with 48% hydrofluoric acid; acetylation of the 3-, 17α-, and 21-hydroxyls, fluorination with sulfur tetrafluoride to the corresponding 5α,6,6-trifluorosteroid; hydrolysis of all acetyl groups; re-formation of the 17α,20; 20,21-bismethylenedioxy group; oxidation of the 3-hydroxyl to the 3-ketone; dehydrofluorination in the C₄–C₅ positions; and removal of the bismethylenedioxy group. An alternative route also is proposed. Title steroids having an oxygenated function in the 11β-position are useful antiinflammatory and glucocortical agents.

BACKGROUND OF THE INVENTION

Field of the invention

This invention relates to a process for the preparation of certain Δ⁴-6,6-difluoro - 3,20 - diketo-17,21-dihydroxy-pregnenes, which are useful as antiinflammatory and glucocorticoid agents. These compounds are suitable for the treatment of allergic diseases, collagen diseases, skin diseases, and the like.

Prior art

U.S. Pat. 3,219,673 (to Boswell) describes a general process for preparing 6,6-difluoro-3-keto-Δ⁴-steroids in which the substituents at C–17 can be among others β-hydroxyl, α- or β-acetoxyl, β-acetyl, and α-methyl. This patent does not disclose 6,6-difluoro-3-keto-Δ⁴-steroids having either the C–17 COCH₂OH substituent or derivatives thereof. It is well known that the 2-hydroxy group is quite reactive and obviously would not survive certain reaction steps of the Boswell process, such as the conversion of the 6-keto group to the 6,6-difluoro group by means of SF₄. Yet, many known biologically active steroids are derived from Δ⁴-17,21-dihydroxy-20-ketopregnene, while a new class of very active antiinflammatory agents have the Δ⁴-6,6-difluoro-17,21-dihydroxy-20-ketopregnene structure.

There is a need, therefore, for a reliable and inexpensive process for the production of such Δ⁴-17,21-dihydroxy-20-ketopregnene derivatives.

SUMMARY OF THE INVENTION

According to this invention, it has now been discovered that certain Δ⁴-6,6-difluoro-17α,21-dihydroxy-20-ketopregnenes can be prepared by a simple series of reactions in which the 17α- and 21-hydroxyls are protected by conversion to bismethylenedioxy derivatives. The divalent bismethylenedioxy group (hereinafter, designated BMD) is shown below, together with the steroid D-ring, to which it is attached.

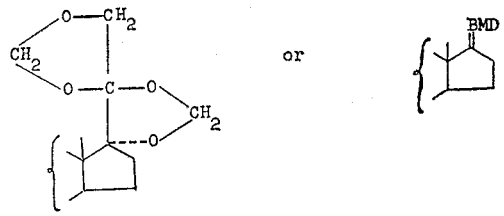

The starting material is represented by the following Formula 1:

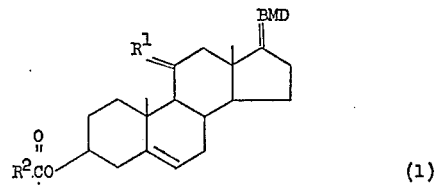

(1)

in which R¹ is two hydrogens or oxygen; and R² is a C₁–C₄ alkyl.

The process of this invention can be illustrated by the following Scheme 1, in which R² is methyl, and the resulting acetyl group is designated Ac:

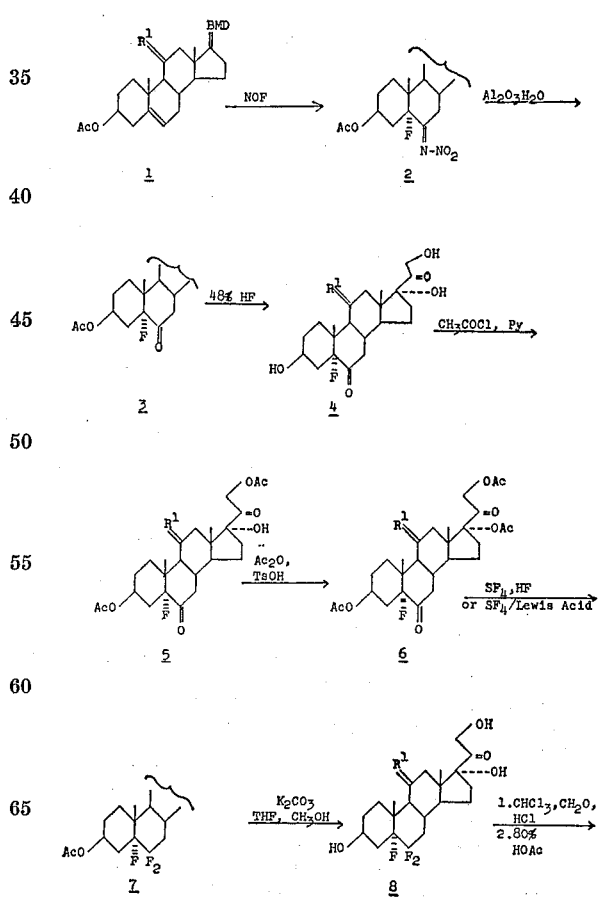

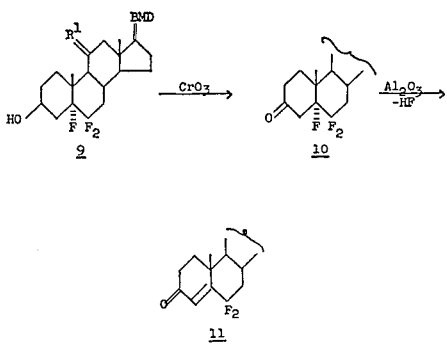

When R¹ is oxygen, and the 11-keto group is desired, the BMD group is hydrolyzed directly with 48% hydroflouric acid. If the 11β-hydroxysteroid, rather than the 11-ketosteroid is desired, the following steps are added:

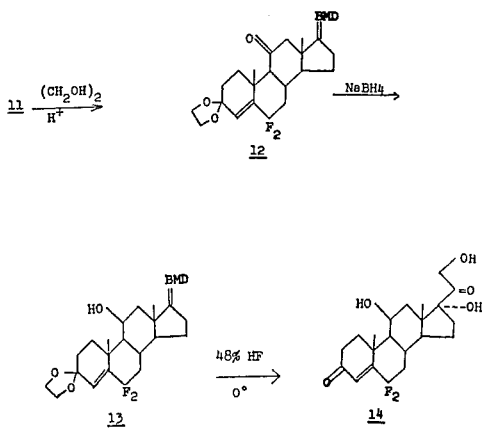

When R¹ is two hydrogens, the BMD group of Compound 11 is hydrolyzed with 48% hydrofluoric acid, and the resulting steroid is microbiologically hydroxylated in the 11β-position.

The above process is susceptible to variations in certain portions thereof without substantially departing from the spirit of the invention. Thus, starting with Compound 3, above, it is possible to fluorinate the C-6 position with $SF_4$, then hydrolyze the 3-acetyl group, and thus obtain Compound 9 in fewer steps.

Many novel intermediates obtained in the above-described process have useful biological properties and thus are valuable themselves.

DETAILED DESCRIPTION OF THE INVENTION

Although the 3-hydroxy group of the starting material is usually blocked by acetylation, any other conventional, hydrolyzable ester can be formed. Suitable ester groups in the C-3 position include, for example, propionate, butyrate, isobutyrate, valerate, and isovalerate, etc., i.e. such ester groups in which R², shown in Formula 1, is ethyl, propyl, isopropyl, butyl, isobutyl, sec-butyl and tert-butyl.

The BMD group can be readily introduced into a 17,21-dihydroxy-20-ketopregnane derivative by reaction of the steroid with either formaldehyde or a formaldehyde source, such as paraformaldehyde or trioxane, in the presence of a strong acid. Hydrochloric acid is most practical for these reactions. The general process for making BMD derivatives of steroid compounds is known to the art and has been disclosed in both scientific and patent literature; see, for example, R. E. Beyler, F. Hoffman, and L. H. Sarett, J. Am. Chem. Soc., 82, 180 (1960).

The first step of the instant process, the reaction of Compound 1 with NOF, is carried out in an inert solvent, for instance, a halogenated hydrocarbon, such as methylene chloride, chloroform, carbon tetrachloride, fluorodichloromethane, and ethylene chloride, or mixtures of these with glyme.

The amount of nitrosyl fluoride employed must, of course, be at least stoichiometric, i.e., two moles per mole of the starting Δ⁵-pregnene. However, it is advantageous to use an excess of nitrosyl fluoride. An initial molar ratio of nitrosyl fluoride to the Δ⁵-pregnene of about 3 to 1 has been found to be particularly practical, high yields of the 5-fluoro-6-nitriminopregnane being obtained in short times.

The reaction is carried out at moderate temperatures, preferably no higher than about 100° C. and especially within the range of about −10° to 30° C. Within this range, the reaction rates are satisfactory and can be easily controlled. Atmospheric pressure is sufficient, although higher pressures sometimes are required to maintain a sufficient concentration of the reactants at the reaction temperatures. Moisture is undesirable in this step because of the danger of NOF hydrolysis.

The nitrosyl fluoride adduct obtained in the first step, the 5-fluoro-6-nitrimino-BMD-pregnane, can be isolated in any conventional manner, such as for example evaporation of the solvent and recrystallization of the residue. In practice, this isolation and purification step is not required, and the crude solution can be directly subjected to the next step, i.e. conversion of the nitrimino group to the keto group.

The solution is first contacted with a weak base, such as aqueous alkali bicarbonate, to remove excess NOF and acidic reaction side products. The solution is then chromatographed on neutral alumina containing 5-15% by weight of water (activity grade III). The 5-fluoro-6-keto-BMD-pregnane, 3, formed in this step is eluted with a suitable solvent or a solvent combination, such as aliphatic or aromatic hydrocarbons. Instead of the chromatographic technique; any other suitable technique for contacting the fluoronitrimino-pregnane solution. Alternatively, the nitrimino group can be hydrolyzed by refluxing a solution of the steroid in aqueous dioxane.

While Compound 3 can be directly fluorinated in the C-6 position, as stated above, such a direct fluorination with $SF_4$ is not practical because the BMD group is to a large extent degraded by the strongly acidic $SF_4/HF$ medium, and the yield of the resulting 5α,6,6-trifluoro-BMD-pregnane is low. Free hydroxyl groups, reformed by hydrolysis of the BMD group, do not survive the reaction conditions.

The preferred technique is to protect the 17- and 21-hydroxyls by acetylation. The BMD group is first hydrolyzed with 48% hydrofluoric acid at about room temperature. The 3-acetoxy group is also hydrolyzed in this step. The 3- and 21-hydroxyls are then acetylated with acetyl chloride in pyridine at or below room temperature. The 17-hydroxyl is more resistant to acetylation but it is conveniently acetylated with acetic anhydride in the presence of p-toluenesulfonic acid. This reaction also is carried out at room temperature.

The resulting triacetoxysteroid is then contacted with sulfur tetrafluoride, which converts the 6-keto group to the 6,6-difluoro group. Hydrofluoric acid or another Lewis acid is necessary in this step as the reaction catalyst. The reaction is carried out in an inert solvent such as e.g., methylene chloride, chloroform, carbon tetrachloride, fluoro-dichloromethane, ethylene chloride, and the like.

Sulfur tetrafluoride can be replaced by selenium tetrafluoride or by an organosulfur fluoride, such as phenylsulfur trifluoride, but sulfur tetrafluoride is the cheapest and the most readily available reagent. Since both sulfur tetrafluoride and hydrogen fluoride are gases at the reaction temperatures, it is practical to carry out this step in a closed reactor, such as a shaking autoclave. The reaction is best carried out at moderate temperatures, be- usually is not practical to lower the temperature below low about 100° C., and preferably at −10 to 30° C. It about −10° C. because the reaction rates are too low for an efficient operation.

The relative proportions of sulfur tetrafluoride and of hydrogen fluoride can be varied within a rather broad range; the molar porportion of hydrogen fluoride in admixture with sulfur tetrafluoride can be as low as zero or as high as about 90%, the 15–20% range being perferred. Although other fluoro Lewis acids, such as $BF_3$ or $SbF_3$ can be used, hydrogen fluoride, either added directly or generated in situ is preferred. HF can be generated in situ by adding to the reacting mixture an active hydrogen-containing compound, such as water or alcohol. Reaction of such compound with $SF_4$ liberates hydrogen fluoride. The 5,6,6-trifluoropregnane can be recovered by conventional methods, such as evaporation of solvent and recrystallization of the residue or column chromatography.

The acetyl groups are then hydrolyzed with mild alkali in an aqueous solvent. Sodium and potassium carbonates and hydroxides are particularly suitable for this reaction. Potassium carbonate is preferred because of its good solubility and because it does not cause undesirable side reactions. A water-miscible solvent such as a lower alcohol, ether or ketone can be used. A mixture of methanol and tetrahydrofuran has been found to be particularly convenient because it dissolves well both the steroid and the alkali.

Prior to the oxidation of the 3-hydroxy to the 3-ketone, the 17- and 21-hydroxyls must again be protected. This is accomplished by re-forming the BMD group, as described above, by means of aqueous formaldehyde in the presence of hydrochloric acid. The reaction is run in a heterogeneous system, the steroid being dissolved in chloroform, and good agitation is essential. The reaction takes several hours at room temperature.

The steroid 9, obtained in the above step, is then oxidized to the 3-keto-5α,6,6-trifluoropregnane BMD derivative, 10. This is done by a conventional reaction, well known in the art. The steroid can be dissolved, for example, in a water-miscible solvent such as a lower ketone or ether and treated with aqueous chromic acid. The reaction is run at about 0° C., and the solution is then allowed to cool to room temperature. The oxidation proceeds fast, a few minutes being sufficient for a quantitative conversion.

The dehydrofluorination at C–4–C–5 positions can be done in any conventional manner, such as, for instance, by dissolving the steroid in ethyl alcohol and adding an alcoholic solution of sodium ethoxide. In practice, it is more convenient to dissolve the steroid in hexane and chromatograph the solution on anhydrous neutral alumina. This technique is described in Boswell's U.S. Pat. 3,219,673. The BMD group can then be hydrolyzed at room temperature by treatment with 48% hydrofluoric acid.

If there is no substituent in the C–11 position ($R^1$ is two hydrogens), the resulting steroid can be microbiologically hydroxylated with a microorganism from the Curvularia family. Suitable microorganisms include *Curvularia lunata* and *Curvularia pallescens*.

If there is a keto group in the C–11 position, it can be reduced to the 11β-hydroxyl prior to the removal of the BMD group. The 3-keto group must be protected from the reducing agent. This can be done by forming a cyclic ketal with ethylene glycol in the presence of an acid catalyst. These reactions are known in steroid chemistry. Both the ethylene ketal and the BMD group are then hydrolyzed with 48% hydrofluoric acid in the manner described above.

If desired, a double bond at C–1–C–2 can also be introduced. This step is accomplished by a microbiological method employing the microorganism *Arthrobacter simplex*.

The final products, whether or not 1,2-unsaturated, and having an 11-keto or an 11β-hydroxyl substituent are useful antiinflammatory and glucocortical agents. They can be administered orally, parenterally or topically with dosage rates generally in the range of 0.0001 to 1 mg. per kg. of body weight per day. These compounds are useful in the treatment of allergic, collagen, skin, musculoskeletal disesases.

Novel intermediates, obtained at various stages of this process, can be represented by the general Formula 15, below.

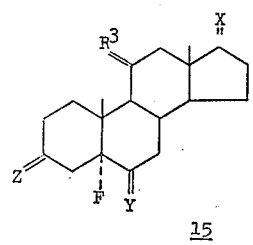

15 in which $R^3$ is $R^1$ or one α-hydrogen and one β-hydroxyl;
X is the bismethylenedioxy group or the

group, in which each of $R^4$ and $R^5$ is individually hydrogen or acetyl group;
Y is the nitrimino group, oxygen, or two fluorine atoms;
Z is oxygen or one α-hydrogen and one β-hydroxyl or one α-hydrogen and one

group, where $R^2$ is a $C_1$–$C_4$ alkyl.

This invention is now illustrated by the following examples of certain preferred embodiments thereof, in which all temperatures are in degrees centigrade, and all proportions and percentages are by weight unless otherwise specified.

EXAMPLE 1.—6,6-difluorocortisol

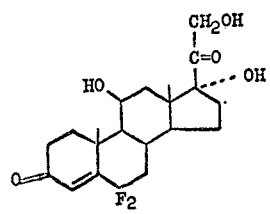

In formulas below, the abbreviation BMD stands for "bismethylenedioxy."

(A) 5σ-fluoro-17α,20:20,21-bismethylenedioxy-3β-hydroxy-pregnane-6,20-dione 3-acetate (1) 17α,20;20,21-BISMETHYLENEDIOXY-3β-HYDROXY-PREGN-5-EN-11-ONE 3-ACETATE

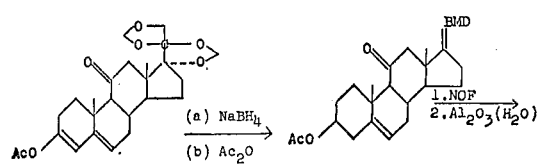

16    17

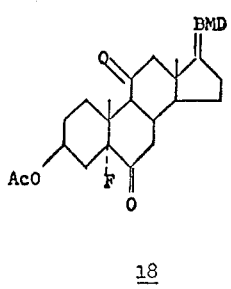

18

A stirred solution of Compound 16 [J. H. Fried, A. N. Nutile, and G. E. Arth, J. Org. Chem. 26, 976 (1961)] (84.5 g.) in 1000 ml. of THF and 500 ml. of methanol was treated portion-wise with sodium borohydride (13 g.) and the mixture was allowed to stir for 16 hours at room temperature. The reaction mixture was taken to dryness under reduced pressure; the resultant residue, suspended in water, collected by filtration, washed well with water and air dried, yielded 78.3 g. of 3β-ol. This was acetylated by dissolving in acetic anhydride (400 ml.) and pyridine (150 ml.) and stirring overnight at room temperature.

Cooling the reaction mixture precipitated a small amount of 3β,11β-diacetate, yield 2 g. The filtrate was diluted with water (5 liters) and the precipitated solid was collected. This in 400 ml. of acetone was oxidized with 8 N chromic acid reagent to convert any 11β-ol to 11-one. The reaction mixture was filtered and the filtrate partitioned between methylene chloride and water, the organic phase dried over anhydrous calcium sulfate, filtered, evaporated to dryness under reduced pressure to give 17 (70 g.); M.P. 157–162° C.

*Analysis.*—Calcd. for $C_{25}H_{34}O_7$ (percent): C, 67.24; H, 7.68. Found (percent): C, 67.21; H, 7.76.

(8) 5α-fluoro-17α,20;20,21-bismethylene-3β-hydroxypregnane-6,20-dione 3-acetate

Nitrosyl Fluoride Addition to Δ⁵-Steroids—General Procedure: In a dry, 500-ml. polyethylene bottle equipped with a magnetic stirring bar and polyethylene gas inlet and exit tubes was placed a solution of Δ⁵-steroid (1–60 g.) in methylene chloride or carbon tetrachloride (100–250 ml.). The exit tube was protected by a drying tube containing calcium chloride, and the system was swept with a stream of nitrogen to remove moisture and air. The reactor was cooled in an ice bath, while a slow stream of nitrosyl fluoride (0.33 to 0.5 times the weight of Δ⁵-steroid charged) was passed into the stirred solution over 3 to 7 hours. During this time, after an initial induction period of ¼–2 hours depending on the rate of flow, the reaction solution became deep blue. As the reaction proceeded the color gradually turned green and finally straw. The reaction mixture was washed with water and saturated salt solution, dried over magnesium sulfate, and evaporated under reduced pressure. The viscous residue was either crystallized from the appropriate solvent system to furnish the fluoronitrimine or chromatographed on neutral Activity Grade III alumina (20–30 g. per g.) of starting Δ⁵-steroid. The eluted solids were crystallized from the appropriate solvent system to furnish the fluoroketone.

Compound 17 (22.5 g.) treated with NOF (ca. 10 g.) in the presence of suspended sodium fluoride (10 g.) to bind any hydrogen fluoride gave fluoroketone 18 (10.8 g., 50% yield after recrystallization from acetone-hexane): M.P. 213–215; [α]_D —60°; λ_max 298 mμ (ε 70).

*Analysis.*—Calcd. for $C_{25}H_{33}FO_8$ (percent): C, 62.48; H, 6.93; F, 3.96. Found (percent): C, 62.72; H, 7.03; F, 4.09.

(B) 5α-fluoro-3β,17α,21-trihydroxy-pregnan-6,11,20-trione (4)

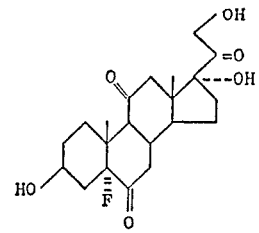

19

Ten grams of steroid fluoroketone 18 was added to 100 ml. of 48% aqueous hydrogen fluoride at 25° and stirred overnight under nitrogen. The reaction mixture was neutralized with saturated aqueous sodium bicarbonate solution. The resulting solid was filtered. Both the solid and filtrate were extracted thoroughly with dioxane. Evaporation of the dioxane gave a residue which was slurried with water, then filtered and dried to give 6.64 g. of 5α-fluoro-3β,17α,21α-trihydroxy-pregnan-6,11,20-trione 19.

IR $\lambda_{max.}^{Nujol}$ 2.90μ (OH); 5.71, 5.79 and 5.83μ ($C_{11}$=O, $C_6$=O, $C_{20}$=O); no absorption at 8μ indicating loss of acetate at C–3

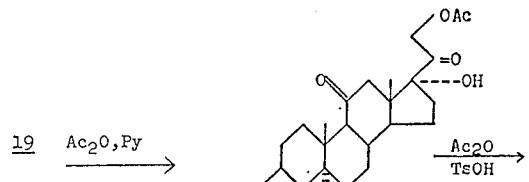

20

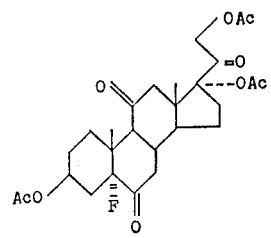

21

Three grams of fluoroketone 19 in 50 ml. pyridine was cooled to 0°, and 1.5 g. of acetyl chloride was added. The solution was stirred overnight at 25° then diluted with water. The precipitate was collected, washed with water and dried to give 1.479 g. of 5α-fluoro-3β,17α,21-trihydroxy-pregnan-6,11,20-trione 3,21-diacetate 20.

NMR H¹: 37 c.p.s. (H–18); 63 c.p.s. (H–19); 122 c.p.s. and 130 c.p.s. (acetates at C–3 and C–21); 320 c.p.s. (H–21).

The crude material from above (1.47 g.) was suspended in a mixture of 30 ml. acetic anhydride and 0.58 g. p-toluenesulfonic acid and stirred at 25° for 24 hrs. It was then cooled in ice and diluted with water. The solid precipitate was collected, washed with water and dried to give 1.464 g. of 5α-fluoro-3β,17α,21-trihydroxy-pregnan-6,11,20-trione 3,17,21-triacetate 21.

NMR F¹⁹: doublet at +9250, 9275 c.ps. (F–5α)

NMR H¹: 39 c.p.s. (H–18); 61 c.p.s. (H–19); 121 and 128 c.p.s. (acetates at C–3, C–17, C–21); 283 c.p.s. (H–21).

(D) 5α,6,6-trifluoro-3β,17α,21-trihydroxy-
pregnan-11,20-dione (22)

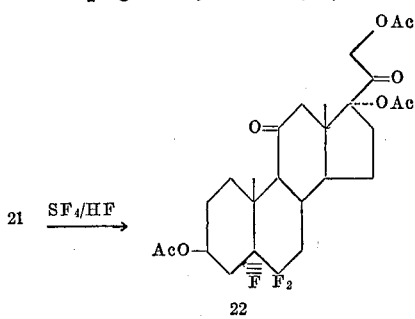

A mixture of 1.3 g. of steroid fluoroketone 21, 20 ml. of methylene chloride, 0.14 ml. of water and 15 g. of sulfur tetrafluoride was allowed to react at 20±2° for 20 hrs. The reaction was poured into water and the organic layer washed well with saturated aqueous sodium bicarbonate, water, and brine. It was dried (MgSO₄) and evaporated. The residue was crystallized from acetone to give 0.806 g. of 5α,6,6 - trifluoro-3β,17α,21-trihydroxy-pregnan-11,20-dione 3,17,21-triacetate 22.

NMR F¹⁹: +6000 c.p.s. (F–6α,β); doublet at +9370, 9415 (F–5α).

NMR H¹: +43 c.p.s. (H–18), multiplet at 77 c.p.s. (H–19); 123 and 130 c.p.s. (acetates at C–3, C–17 and C–21); 287 c.p.s. (H–21).

(D) 5α,6,6-trifluoro-3β,17α,21-trihydroxy-pregnan-11,20-dione (23)

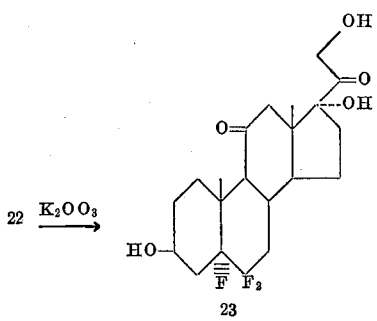

Steroid triacetate (22), 1.088 g. in a solution of 200 ml. deaerated methanol and 100 ml. deaerated tetrahydrofuran, under nitrogen and at 25°, was treated with 420 mg. of potassium carbonate in 12 ml. of water. Stirring was continued at 25° for 6 hrs.; then, the reaction was diluted with water and extracted with ethyl acetate to give 3β,17α,21-trihydroxy-5α,6,6-trifluoropregnan-11,20-dione 23.

(E) 5α,6,6-trifluoro-3β,17α,21-trihydroxy-pregnan-11,20-dione BMD (24)

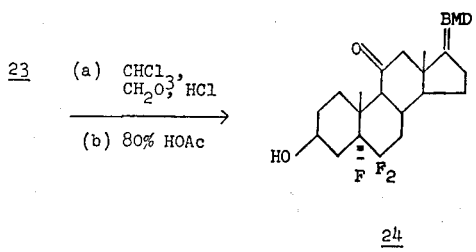

Steroid 23, 1.5 g. in 180 ml. of chloroform was stirred at 25° with 45 ml. of 40% formaldehyde solution and 45 ml. of concentrated hydrochloric acid for 60 hrs. The organic layer was separated and the aqueous layer extracted several times with chloroform. The combined chloroform solutions were washed with aqueous sodium bicarbonate, water, dried (MgSO₄) and evaporated to give a partially crystalline residue. This crude residue was hydrolyzed with boiling 80% aqueous acetic acid (100 ml.) of 0.5 hr. Precipitation with water gave 5α,6,6-trifluoro-3β,17α,21-trihydroxy-pregnan - 11,20 - dione bismethylenedioxy derivative 24, M.P. 200–202° C.

Infrared (CHCl₃ soln.): 2.82μ (sharp, free OH), 3.08μ (broad, bonded OH) and 5.82μ (11 C=O).

NMR H¹ (CDCl₃ soln.): 0.79 (C–18), triplet 1.25 (J=3 c.p.s., C–19), 1.70 (OH), 3.95 (21–H), 5.0, 5.06 and 5.18 p.p.m. (two —O—CH₂—O-groups).

(F) 5α,6,6-trifluoro-17α,20; 20,21-bismethylene-dioxypregnane-3,11-dione (25)

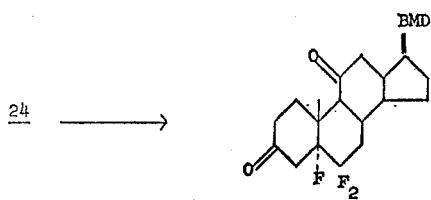

A solution of 0.61 g. (1.32 mmoles) of trifluoride 24 in 50 ml. of acetone cooled in an ice bath was treated dropwise with 0.65 ml. of 8 N chromic acid reagent. When the addition had been completed, the ice bath was removed and the orange-red reaction mixture was stirred for an additional 15 mins. Methanol (1 ml.) was then added, the reaction mixture stirred for 10 mins. and filtered into 1400 ml. of ice water. The white solid which separated was collected by filtration to give 0.55 g. (93%) of 5α,6,6 - trifluoro-17α,20,20,21-bismethylenedioxypregnane-3,11-dione 25, M.P. 203–204° C. (dec.).

Infrared (Nujol): Sh. 5.82μ (3 C=O) and 5.86μ (11 C=O).

NMR H¹ (CDCl₃ soln.): 0.85 (C–18), 1.27 (C–19), 3.97 (21–H), 5.02 and 5.20 p.p.m. (two —O—CH—O-groups).

(G) 6,6-difluoro-17α,20; 20,21-bismethylene-dioxypregn-4-ene-3,11-dione (26)

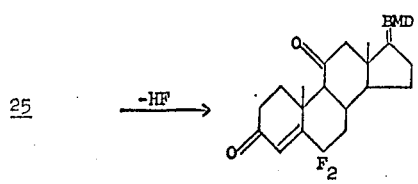

The trifluorodione, 25 (1.668 g., 3.63 mmoles) was dissolved in benzene and chromatographed on a column of 60 g. of neutral Activity Grade III alumina. The column was developed with hexane, and the product 26 was then eluted with benzene, 1.54 g. (97%).

Infrared (CHCl₃ soln.): Sh. 5.85μ (C–11 C=O) 5.92μ (3 C=O) and Sh. at 6.02μ (C=C).

NMR H¹ (CDCl₃ soln.): 0.85 (C–18), doublet at 1.48 (J=2 c.p.s., C–19), 3.97 (21–H), multiplet at 4.98, 5.04, 5.05 and 5.18 (two OCH₂O groups), and a doublet at 6.25 p.p.m. (J=4 c.p.s., 4–H).

NMR F¹⁹ (CDCl₃ soln., 56.4 mc. vs. internal F–11): a poorly resolved AB pattern at +4700, +4965, +5635 and +5889 c.p.s. (triplet J=4.54 c.p.s.) the two lower signals being further split.

(H) 6,6-difluoro-3-ethylenedioxy-17α,20;20,21-bismethylenedioxy-4-pregnen-11-one (27)

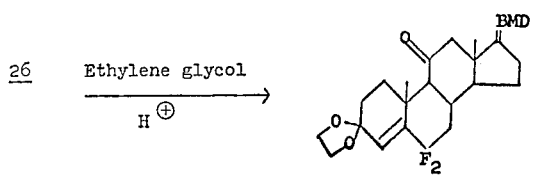

The difluorodione 26 (1.668 g., 3.82 mmoles) was dissolved in 100 ml. of benzene and treated with 2.9 ml. of ethylene glycol and 270 mg. of oxalic acid dihydrate. The reaction mixture was heated at reflux temperature under a Dean-Stark tube overnight and washed in turn with a standard aqueous solution of sodium bicarbonate, with water, with a saturated aqueous sodium chloride solution and dried (CaSO$_4$). The filtered solution was taken to dryness in vacuo to give 1.54 g. (83%) of the ketal 27.

NMR H$^1$ (CDCl$_3$ soln.): 0.85 (C–18), 1.25 (ethylenedioxy group), a doublet at 1.48 (J=2.5 c.p.s., C–19), 3.97 (21–H), a multiplet at 5.00, 5.05, 5.06 and 5.20 (two —O—CH$_2$—O— groups) and a doublet at 6.25 p.p.m. (J=4 c.p.s., 4–H).

(I) 6,6-difluoro-3-ethylenedioxy-17α,20;20,21-bismethylenedioxy-4-pregnen-11β-ol (28)

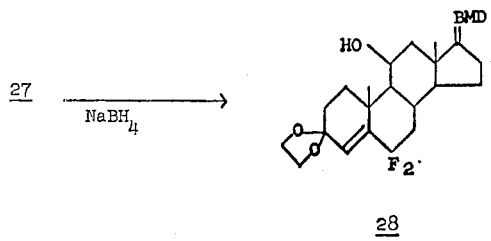

A solution of 210 mg. (0.436 mmole) of the difluoroketone 27 in 25 ml. of tetrahydrofuran and 25 ml. of methanol was treated with 250 mg. of sodium borohydride. The reaction mixture was stirred at ambient temperature for 26 hrs. and concentrated in vacuo. Water was added to the concentrate to precipitate the 11β-alcohol 28 189 mg. (89%) M.P. 104–108° C.

Infrared (CDCl$_3$ soln.): 2.76 and 2.88μ free and bonded OH respectively).

NMR H$^1$ (CDCl$_3$ soln.): 1.11 (C–18), 1.25 (ethylenedioxy group), a doublet at 1.40 (J=4.5 c.p.s., C–19), 3.98 (C–21), 5.0 and 5.20 (two —O—CH$_2$—O groups) and a doublet at 5.90 p.p.m. (J=4 c.p.s., 4–H).

NMR F$^{19}$ (CDCl$_3$ soln.), 56.4 (mc., vs. internal F–11): an AB pattern at +4660, +4900, +5494 and 5834 c.p.s. the two lower signals being further split into triplets (J=40 c.p.s.).

(J) 6,6-difluorocortisol (29)

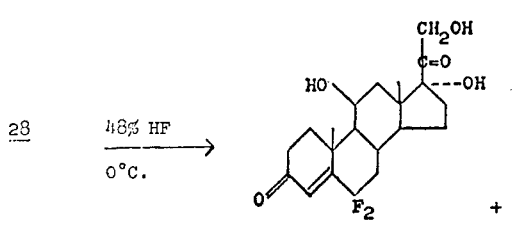

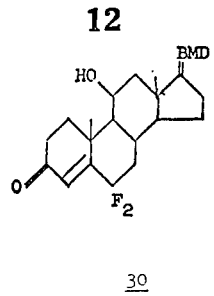

The difluoroalcohol 29 (250 mg., 0.516 mmole) in a 1 oz. polyethylene bottle was treated with 2.5 ml. of 48% hydrofluoric acid and stirred for 90 mins. while cooling in an ice bath. By the end of this period some oily solid remained on the walls of the bottle, the remainder having dissolved. The reaction mixture was then poured into an aqueous potassium carbonate solution. The polyethylene bottle was washed with tetrahydrofuran and the washings also poured into the potassium carbonate solution. The product was then extracted with ethyl acetate and the resulting organic phase washed with a saturated aqueous sodium chloride solution and dried (CaSO$_4$). The filtered solution was taken to dryness in vacuo to give 210 mg. of a crystalline solid mixture consisting of equal amounts of the steroids 29 and 30 along with a small amount of unchanged 28. The NMR F$^{19}$ spectrum (deuterio-acetone-vs. internal F–11) of this mixture accordingly shows three overlapping AB patterns the two lower signals being forther split and ranging from +4544–4943 c.p.s. The higher field half of the pattern exhibits weak signals at +5605 and +5856 c.p.s. for unchanged 28 and approximately equally intense signals at +5518, +5551, +5763 and +5805 c.p.s. for 29 and 30.

The mixture was readily resolved by this layer chromatography using a Brinkman silica gel F–254 plate and ethyl acetate development. The following R$_f$ values were observed: 0.25 (30), 0.52 and 0.56 (29 and 28).

Although the protecting groups can also be removed with acetic acid, the reaction is not as clean, and the hydrochloric acid method appears to be superior.

PURIFICATION, ISOLATION AND CHARACTERIZATION OF 6,6-DIFLUOROCORTISOL (29)

The mixture of 28, 29 and 30 (210 mg.) was chromatographed on Florisil® (25 g.) prepared in hexane. Cuts 52–55 (91 mg.) solidified on standing; NMR H$^1$ (d-acetone), 0.92 (18–H), 1.53 (19–H, doublet, J=3 Hz.) 2.91 (OH), 6.03 p.p.m. (4–H, doublet, J=4 Hz.); λ$_{max}$ 226 (ε 6000), 273 (ε 270), and 282 (ε 235).

Analysis.—(mass spectrum) Calcd. for C$_{21}$H$_{28}$F$_2$O$_5$ (percent) 398.1905. Found (percent): 398.1908.

Cut 52 crystallized from acetane-hexane, M.P. 225–230°.

EXAMPLE 2.—ALTERNATIVE ROUTE TO COMPOUND 24

(A) 5α,6,6-trifluoro-17α,20; 20,21-bismethylenedioxy-3β-hydroxypregnan-11-one 3-acetate (31)

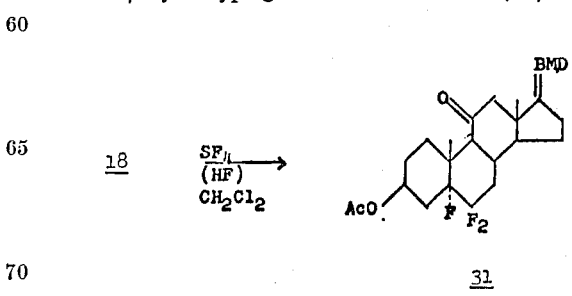

A Hastelloy® bomb containing fluoroketone 18 (1.0 g.), water (0.5 ml.), THF (3 ml.), SF$_4$ (about 40 g.), and methylene chloride (25 ml.) was shaken for 10 hours at 20±2°. The bomb was vented and the reaction mixture was worked up in the usual manner (washed with water, 5% sodium bicarbonate solution, dried over MgSO₄, and evaporated to dryness under reduced pressure) to give a solid residue (1 g.). The NMR H¹ spectrum (CDCl₃) showed a good conversion (at least 50%) of 18 to the trifluoride 31: 18–H (0.78 p.p.m.) 19–H (1.25 p.p.m.). The 19–H's of fluoroketone 18 appear at 1.0–1.05 p.p.m. Chromatography on Florisil® followed by crystallization of the appropriate fractions as determined by NMR H¹ spectra from acetone-hexane and then hexane gave the trifluoroketone 31 (33 mg.): M.P. 104–108°; $[\alpha]_D$ —44°.

Analysis.—Calcd. for $C_{25}H_{33}F_3O_7$ (percent): C, 59.8; H, 6.62. Found (percent): C, 60.38; H, 6.91. The mass spectrum showed a weak parent ion (502 m/e); the most abundant m/e ion was 474.

Continued elution of the column with increasing amounts of acetone in hexane (2–4% acetone by volume) gave mixtures of unchanged 18 and 31 and finally relatively pure 18. Compounds 18 and 31 are difficult to separate by either column or preparative thin layer chromatography.

(B) 5α,6,6-trifluoro-17α,20; 20,21-bismethylenedioxy-3β-hydroxypregnan-11-one (24)

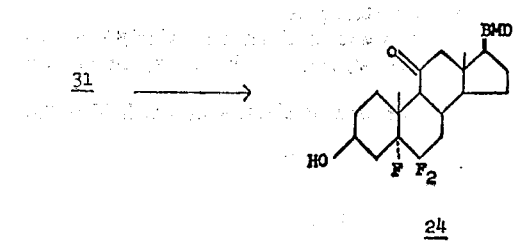

To a solution of 0.76 g. (1.51 mmoles) of the trifluoride 31 in 100 ml. of methanol and 20 ml. of tetrahydrofuran there was added a solution of 0.415 g. (3 mmoles) of anhydrous potassium carbonate in 20 ml. of water. This solution was stirred at ambient temperature for 20 hrs. while passing nitrogen through this solution during the entire period. The reaction mixture was poured into 1000 ml. of ice water and the white solid 24 which separated was collected by filtration, 0.621 g. (89%), M.P. 200–202° C.

Infrared (CHCl₃ soln.): 2.82μ (sharp, free OH), 3.08μ (broad, bonded OH) and 5.82μ (11 C=O).

NMR H¹ (CDCl₃ soln.): 0.79 (C–18), triplet 1.25 (J=3 c.p.s., C–19), 1.70 (OH), 3.95 (21–H), 5.0, 5.06 and 5.18 p.p.m. (two—O—CH₂—O-groups).

Difluororocortisol, compound 29, is effective as an antiinflammatory agent and has a good glucocorticoid activity.

Antiinflammatory activity was measured on 21-day-old male rats by inuncting an 0.05 ml. solution of the steroid in 20% pyridine, 5% water, 74% diethyl ether and 1% croton oil to each the inside and outside of an ear with the total dose of steroid varied from 0.3 to 2.7 μg. Ears were removed 6 hrs. after administration and uniform pieces punched out and weighed. The weight decreases were compared to a control in which no steroid was used to show this activity.

Topically applied antiinflammatory corticosteroids also induce vasoconstriction. This can be shown by application of an ethanol solution of the steroid at concentrations of about 1×10⁻³ to 1×10⁻⁸ to small 7 x 7 mm. squares of forearm skin for about 20 hrs. and comparison with standard compounds.

The embodiments of the invention in which an exclusive property or privilege is claimed are defined as follows:

1. A process for the preparation of a steroid compound having the formula

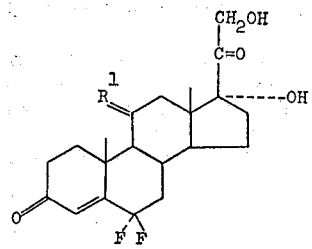

in which R¹ is oxygen or two hydrogens, said process comprising the following sequential steps:

(a) contacting a steroid of the formula

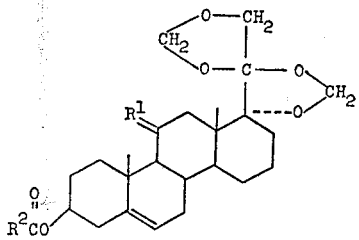

in which R¹ has the same meaning as above, and R² is a C₁-C₄ alkyl with NOF in an inert solvent at a temperature of about —10 to 100° C., under substantially anhydrous conditions, the amount of nitrosyl fluoride being at least about 2 moles per mole of the starting Δ⁵-steroid; thus producing the corresponding 5α-fluoro-6-nitriminosteroid;

(b) contacting the solution of step (a), above, with a weak base to remove excess reagent and acidic reaction side products, and contacting the solution with neutral alumina containing 5–15 weight percent of water to produce the corresponding 5α-fluoro-6-ketosteroid;

(c) contacting the product of step (b), above, at room temperature with about 48 weight percent aqueous hydrofluoric acid to hydrolyze both the 17α,20; 20, 21-bismethylenedioxy group and the 3-alkanoyloxy group, then acetylating the 3- and 21-hydroxyls by treating the steroid with acetyl chloride in pyridine solution at or below room temperature;

(d) acetylating the 17-hydroxyl by contacting the product of step (c) with acetic anhydride in the presence of p-toluenesulfonic acid at about room temperature;

(e) contacting the product of step (d), above, with a fluorinating agent selected from sulfur tetrafluoride, selenium tetrafluoride, and phenylsulfur trifluoride, and phenylsulfur trifluoride in the presence of a Lewis acid selected from HF, BF₃, and SbF₅ at a temperature of —10 to 100° C. in an inert solvent, and under substantially anhydrous conditions;
  with the proviso that when sulfur tetrafluoride and HF are used, the molar proportion of HF in the mixture does not exceed about 90%;
  thus producing the corresponding 5α,6,6-trifluorosteroid;

(f) contacting the product of step (e), above, dissolved in a water-miscible solvent with aqueous alkali at about —10 to 35° C. to remove the 3-, 17-, and 21-acetylgroups;

(g) re-forming the 17α,20; 20, 21-bismethylenedioxy group by contacting the product of step (f), above, in chloroform solution, with aqueous formaldehyde in presence of hydrochloric acid at room temperature, while well agitating the heterogeneous mixture;

(h) oxidizing the 3-hydroxyl to the 3-ketone by contacting the product of step (g), above, in a water-miscible solvent solution with aqueous chromic acid at a temperature not exceeding about 35° C.; and (i) dehydrofluorinating the product of step (h), above, in C–4—C–5 positions by contacting a solution of said product in hexane with anhydrous, neutral alumina.

2. The process of claim 1 in which the maximum temperature in step (a) is about 30° C.; and the maximum temperature in step (e) is about 30° C., and a mixture of $SF_4$ with HF is used.

3. A process for the preparation of the steroid compound of claim 1 having the formula

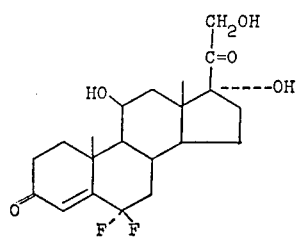

from the compound having the formula

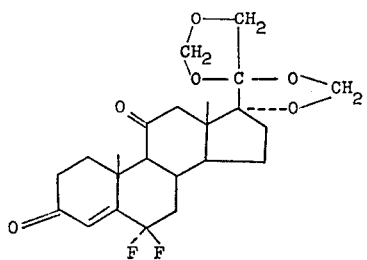

said process involving the following sequential steps:
(a) forming a 3,3-ethylene ketal by contacting the starting steroid with ethylene glycol in the presence of an acid catalyst;
(b) contacting the above ketal with sodium borohydride to reduce the 11-keto group; and
(c) hydrolyzing both the 3-ketal and the 17α,20; 20, 21-bismethylenedioxy group in the presence of about 48 weight percent aqueous hydrofluoric acid.

4. A steroid compound having the formula

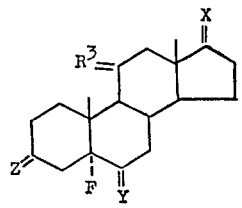

in which

Z is oxygen, one α-hydrogen and one β-hydroxyl or one α-hydrogen and one

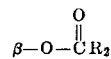

group, in which $R^2$ is a $C_1$–$C_4$ alkyl;
Y is the nitrimino group, oxygen or two fluorine atoms;
X is the bismethylenedioxy group or the

group, in which each of
$R^4$ and $R^5$ is individually hydrogen or the acetyl group; and
$R^3$ is oxygen, two hydrogens, or one α-hydrogen and one β-hydroxyl.

5. A steroid compound of claim 4 in which X is the bismethylenedioxy group.

6. A steroid compound of claim 5 in which Y is oxygen; Z is one hydrogen and one hydroxyl; and $R^3$ is oxygen or two hydrogens.

7. A steroid compound of claim 5 in which Y is two fluorine atoms; Z is one hydrogen and one acetoxyl; and $R^3$ is oxygen or two hydrogens.

8. A steroid compound of claim 5 in which Y is two fluorine atoms; Z is oxygen; and $R^3$ is oxygen or two hydrogens.

9. A steroid compound of claim 4 in which X is the

group,
$R^4$ being alkyl, and
$R^5$ being hydrogen.

10. A steroid compound of claim 9 in which Y is oxygen; Z is one hydrogen and one acetoxyl; and $R^3$ is oxygen or two hydrogens.

11. A steroid compound of claim 9 in which each of $R^4$ and $R^5$ is hydrogen; Y is two fluorine atoms; Z is one hydrogen and one hydroxyl; and $R^3$ is oxygen or two hydrogens.

References Cited
UNITED STATES PATENTS 3,546,215   12/1970   Fried   260—239.55

ELBERT L. ROBERTS, Primary Examiner

U.S. Cl. X.R.
260—397.45; 397.47

UNITED STATES PATENT OFFICE
CERTIFICATE OF CORRECTION

Patent No. 3,641,005      Dated February 8, 1972

Inventor(s) George A. Boswell, Jr. and William C. Ripka

It is certified that error appears in the above-identified patent and that said Letters Patent are hereby corrected as shown below:

Col. 10, line 42, "two-O-CH-O-" should be
           -- two-O-CH$_2$-O- --;

Col. 12, line 52, "percent" should be deleted in both occurrences;

Col. 14, line 58, "and phenylsulfur trifluoride" should be deleted;

Signed and sealed this 26th day of September 1972.

(SEAL)
Attest:

EDWARD M. FLETCHER, JR.
Attesting Officer

ROBERT GOTTSCHALK
Commissioner of Patents